United States Patent

Demmerle et al.

(10) Patent No.: US 10,017,176 B2
(45) Date of Patent: Jul. 10, 2018

(54) POWER SUPPLY SYSTEM OF A MOTOR VEHICLE, MOTOR VEHICLE, AS WELL AS METHOD FOR OPERATING A POWER SUPPLY SYSTEM

(71) Applicant: GM GLOBAL TECHNOLOGY OPERATIONS LLC, Detroit, MI (US)

(72) Inventors: Markus Demmerle, Ruesselsheim (DE); Reiner Zerjeski, Ruesselsheim (DE)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 15/268,888

(22) Filed: Sep. 19, 2016

(65) Prior Publication Data

US 2017/0080925 A1    Mar. 23, 2017

(30) Foreign Application Priority Data

Sep. 19, 2015  (DE) .................. 10 2015 012 358

(51) Int. Cl.
*B60W 20/50*    (2016.01)
*H02J 7/14*    (2006.01)
(Continued)

(52) U.S. Cl.
CPC .......... *B60W 20/50* (2013.01); *B60L 11/1868* (2013.01); *B60W 10/08* (2013.01);
(Continued)

(58) Field of Classification Search
CPC ............. H02J 7/1423; H02J 9/06–9/08; F02N 11/0814–11/084; F02N 11/0866;
(Continued)

(56) References Cited

U.S. PATENT DOCUMENTS 5,162,720 A * 11/1992 Lambert ............... H02J 7/0024
307/150
6,271,642 B1 * 8/2001 Dougherty ........... G08B 29/181
320/104
(Continued)

FOREIGN PATENT DOCUMENTS

DE        10100889 A1 *  7/2002  ............ B60K 6/485
DE        10248415 A1      5/2004
(Continued)

OTHER PUBLICATIONS

EPO machine translation of EP 753925 (original EP document published Jan. 15, 1997) (Year: 1997).*

(Continued)

*Primary Examiner* — Behrang Badii
*Assistant Examiner* — David A Testardi
(74) *Attorney, Agent, or Firm* — Lorenz & Kopf, LLP

(57) ABSTRACT

A power supply system of a motor vehicle includes a first electric system having a first motor vehicle battery and a first consumer. A second electric system includes a second motor vehicle battery and a second consumer. An autonomous switch is configured to connect and separate the first electric system and the second electric system. The autonomous switch connects the first electric system and the second electric system to one another by closing the autonomous switch if a failure or impending failure of the energy supply of the first electric system or the second electric system is detected.

14 Claims, 1 Drawing Sheet

(51) Int. Cl.
*B60L 11/18* (2006.01)
*F02N 11/08* (2006.01)
*B60W 10/08* (2006.01)
*B60W 50/02* (2012.01)
*F02D 41/04* (2006.01)
*F02D 41/12* (2006.01)

(52) U.S. Cl.
CPC ....... *B60W 50/0205* (2013.01); *F02D 41/042* (2013.01); *F02D 41/123* (2013.01); *F02N 11/087* (2013.01); *F02N 11/0814* (2013.01); *F02N 11/0866* (2013.01); *H02J 7/1423* (2013.01); *B60W 2510/06* (2013.01); *B60W 2710/086* (2013.01); *F02N 2250/02* (2013.01); *Y02T 10/48* (2013.01); *Y02T 10/7055* (2013.01); *Y10S 903/906* (2013.01)

(58) Field of Classification Search
CPC ............ Y02T 10/48; Y02T 10/7055–10/7066; B60W 20/40; B60W 30/18018; B60W 20/50; B60L 11/1868; F02D 41/123
See application file for complete search history.

(56) References Cited

U.S. PATENT DOCUMENTS

| | | | | |
|---|---|---|---|---|
| 6,313,546 | B1* | 11/2001 | Nishimura | H02J 7/0054 307/125 |
| 6,731,021 | B1* | 5/2004 | Urlass | H02J 7/1423 307/10.1 |
| 7,038,427 | B2* | 5/2006 | Kok | B60R 16/03 320/167 |
| 8,275,504 | B2* | 9/2012 | Chen | B60L 11/1861 701/1 |
| 8,860,244 | B2 | 10/2014 | Hattori | |
| 9,322,343 | B2 | 4/2016 | Tribulowski et al. | |
| 2004/0195997 | A1* | 10/2004 | Borrego Bel | H02J 7/1423 320/103 |
| 2006/0058897 | A1* | 3/2006 | Senda | B60R 16/03 700/22 |
| 2009/0314561 | A1* | 12/2009 | Handa | F02N 11/0866 180/65.25 |
| 2011/0012424 | A1* | 1/2011 | Wortberg | H02J 7/1423 307/10.1 |
| 2011/0140518 | A1* | 6/2011 | Hattori | H02J 7/1423 307/9.1 |
| 2013/0106180 | A1* | 5/2013 | Akimasa | F02N 11/0814 307/9.1 |
| 2013/0106181 | A1* | 5/2013 | Cuevas | B60R 16/03 307/10.6 |
| 2013/0162030 | A1* | 6/2013 | Sonesson | B60L 1/00 307/10.1 |
| 2013/0249468 | A1* | 9/2013 | Bajjuri | F02N 11/0825 320/104 |
| 2013/0264869 | A1* | 10/2013 | Klinkig | B60R 16/03 307/10.6 |
| 2015/0134231 | A1* | 5/2015 | Li | F02N 11/0814 701/112 |
| 2015/0149014 | A1* | 5/2015 | Kees | B60L 1/00 701/22 |
| 2015/0251559 | A1* | 9/2015 | Chauvelier | B60L 1/00 307/9.1 |
| 2015/0303716 | A1* | 10/2015 | Lee | H02J 7/0054 307/10.1 |
| 2015/0377979 | A1* | 12/2015 | Barth | G01R 31/3637 324/433 |
| 2016/0001719 | A1* | 1/2016 | Frost | B60L 11/1868 307/10.1 |

FOREIGN PATENT DOCUMENTS

| | | | | |
|---|---|---|---|---|
| DE | 102004016292 A1 | 10/2005 | | |
| DE | 102013221972 A1 | 4/2015 | | |
| EP | 753925 A2 * | 1/1997 | | |
| EP | 1520752 A1 * | 4/2005 | ............ | B60R 16/03 |
| JP | 2006029142 A | 2/2006 | | |
| WO | WO-2013/042717 A1 * | 3/2013 | | |

OTHER PUBLICATIONS

EPO machine translation of EP 1520752 (original EP document published Apr. 6, 2005) (Year: 2005).*
German Patent Office, German Search Report for German Application No. 102015012358.0, dated Jun. 21, 2016.

* cited by examiner

POWER SUPPLY SYSTEM OF A MOTOR VEHICLE, MOTOR VEHICLE, AS WELL AS METHOD FOR OPERATING A POWER SUPPLY SYSTEM

CROSS-REFERENCE TO RELATED APPLICATION

This application claims priority to German Patent Application No. 102015012358.0, filed Sep. 19, 2015, which is incorporated herein by reference in its entirety.

TECHNICAL FIELD

The present disclosure pertains to a power supply system of a motor vehicle, a motor vehicle, as well as a method for operating a power supply system. Motor vehicles feature power supply systems for supplying electrical power consumers (or simply consumers) with energy. These power supply systems are typically equipped with motor vehicle batteries. Some power supply systems of motor vehicles feature two on-board electric systems that are respectively provided with their own motor vehicle battery.

BACKGROUND

Some motor vehicles are equipped with so-called automatic start-stop systems that shut off the engine at standstill in order to save energy. A few motor vehicles have a similar functionality while driving. In such a driving mode, the drive train is decoupled from the wheels of the motor vehicle and either set to idle speed or completely shut off. Such a driving mode is colloquially referred to as coasting. While driving, electrical consumers of the motor vehicle are supplied with electric energy by a generator that is driven by the engine. If the engine is completely shut off in the coasting mode, however, the generator can no longer generate energy. The electrical consumers therefore have to be supplied with electric energy by the motor vehicle battery.

Certain electrical consumers of a motor vehicle are particularly relevant to the safety of a moving motor vehicle. These include, among other things, electrically operated power-steering systems, displays in the motor vehicle, as well as certain sensors such as certain electric actuators. It is therefore important to ensure a particularly high operational safety of a rolling motor vehicle in case the engine is shut off.

DE 199 57 478 A1 discloses a two-battery system with a starter, a generator, a starter battery, an electric system battery, consumers specific to the electric system and consumers relevant to the starter. A first electronic pole binder is arranged between the starter and the starter battery and a second electronic pole binder is arranged between the starter and the electric system battery. Before a starting process is initiated, the control unit of the electric system checks the state of charge of the electric system battery and the starter battery. If it is determined that the electric system battery is charged and the starter battery is discharged, a power switch is closed by the control unit of the electric system. In this way, the electric system battery can supply consumers relevant to the starter in the starting phase.

SUMMARY

The present disclosure provides a power supply system of a motor vehicle, which ensures the utmost operational safety of a rolling motor vehicle in case the engine is deactivated.

A power supply system of a motor vehicle of the type described below features a first electric system with a first motor vehicle battery and a first consumer. In addition, a second electric system with a second motor vehicle battery and a second consumer is provided. The power supply system is furthermore equipped with an autonomous switch, by which the first electric system and the second electric system can be connected to one another and separated from one another. The autonomous switch is designed for connecting the first electric system and the second electric system to one another by closing the autonomous switch if a failure or impending failure of the energy supply of the first electric system or the second electric system is detected.

In such instances, the autonomous switch can connect the two electric systems to one another such that the first consumer of the first electric system can be supplied by the motor vehicle battery of the second electric system if the first motor vehicle battery fails and visa versa. The two interconnected electric systems can then be supplied with energy by one of the two motor vehicle batteries for a certain time period. This time period suffices, for example, for restarting the engine and thereby once again supplying the electrical consumers with energy by the engine.

In a first enhancement, the autonomous switch may feature an autonomous control. The control may serve for respectively monitoring the first electric system and the electric system or their motor vehicle batteries and for detecting or predicting a failure thereof. In this case, the autonomous control operates independently of the remaining control and the autonomous switch can very quickly react to an impending failure of one of the electric systems.

In another enhancement, the second consumer may be safety-relevant. In this case, the second electric system can be configured, in particular, for supplying safety-relevant consumers with energy. Furthermore, an adapted design makes it possible to realize the second electric system with greater operational reliability than the first electric system such that it is possible to save costs in comparison with an electric power supply, in which the design of the complete electric system has to be correspondingly adapted to the safety-relevant consumers.

In an enhancement, a generator is provided in the first electric system or in the second electric system in order to charge the first motor vehicle battery and/or the second motor vehicle battery. The costs and the weight can be reduced by providing a single generator.

In an enhancement, the first electric system and the second electric system may be connected to one another by a DC/DC converter. The DC/DC converter makes it possible to charge the motor vehicle battery of the electric system, in which no generator is provided.

In an enhancement, the autonomous switch may feature at least one voltage meter and/or at least one meter for the voltage differential between the first electric system and the second electric system. Such voltage meters or voltage differential meters can be used for statically and/or dynamically measuring voltage levels and/or voltage differentials between the first electric system and the second electric system such that a failure of the energy supply of one of the electric systems can be detected.

In a further enhancement of this embodiment, the at least one voltage meter may be configured to measure a voltage drop rate. In this way, a rapid voltage drop can be detected and the autonomous switch can be closed.

In an enhancement, a motor vehicle control is provided and connected to the autonomous switch. This motor vehicle control can set the autonomous switch to an active state and to a passive state. In this way, the autonomous switch can be activated during the transition of the motor vehicle into a coasting mode. The autonomous switch can be set to the passive state as soon as the engine is restarted and the generator can once again supply the two electric systems with power.

The present disclosure also pertains to a motor vehicle with at least one power supply system of the above-described type. A corresponding motor vehicle can implement a coasting mode and simultaneously ensure high operational safety due to two electric systems that can be coupled to one another.

In an enhancement, the motor vehicle may be configured to shut off the engine while driving. The motor vehicle control is configured to set the autonomous switch to the active state when an engine shut-off is imminent. The autonomous switch can thereby remain deactivated in a normal operating mode.

In another enhancement, the safety-relevant consumer of the motor vehicle may be supplied by the second electric system. In this way, safety-relevant consumers can be bundled into one electric system, which can be designed separately for this purpose.

Another aspect of the present disclosure pertains to a method for operating a power supply system of the above-described type. The autonomous switch detects a failure or impending failure of the energy supply of the first electric system or the second electric system and connects the first electric system and the second electric system to one another by closing the autonomous switch. In this way, both electric systems can be coupled to one another and all consumers of the first electric system and the second electric system can be jointly supplied with energy.

According to an enhancement of the method, the autonomous switch detects a failure or impending failure of the first electric system or the second electric system based on a lower limiting voltage not being reached or an upper limiting voltage being exceeded. A corresponding voltage drop or voltage exceedance makes it possible to deduce that the energy supply of the first electric system or the second electric system is defective. The voltage supply for all consumers can be stabilized by short-circuiting the electric systems.

According to another enhancement of the method, the autonomous switch detects a failure or impending failure of the first electric system or the second electric system based on a voltage drop rate. A rapid voltage drop, in particular, also makes it possible to deduce that a voltage supply is defective.

Another aspect of the present disclosure pertains to a device for operating a power supply system. An autonomous switch is provided with a device for detecting a failure or impending failure of the energy supply of a first electric system or a second electric system. The autonomous switch is designed for connecting the first electric system and the second electric system to one another by closing the autonomous switch.

In an enhancement, the present disclosure the device detects if a lower limiting voltage has not been reached and/or means are provided for detecting if an upper limiting voltage has been exceeded. In another enhancement, the autonomous switch is configured to detect a voltage drop rate. In another enhancement, the autonomous switch is configured to set to an active state when an engine shut-off is imminent.

BRIEF DESCRIPTION OF THE DRAWINGS

The present disclosure will hereinafter be described in conjunction with the following drawing figures, wherein like numerals denote like elements.

DETAILED DESCRIPTION

The following detailed description is merely exemplary in nature and is not intended to limit the invention or the application and uses of the invention. Furthermore, there is no intention to be bound by any theory presented in the preceding background of the invention or the following detailed description.

Figure 1:
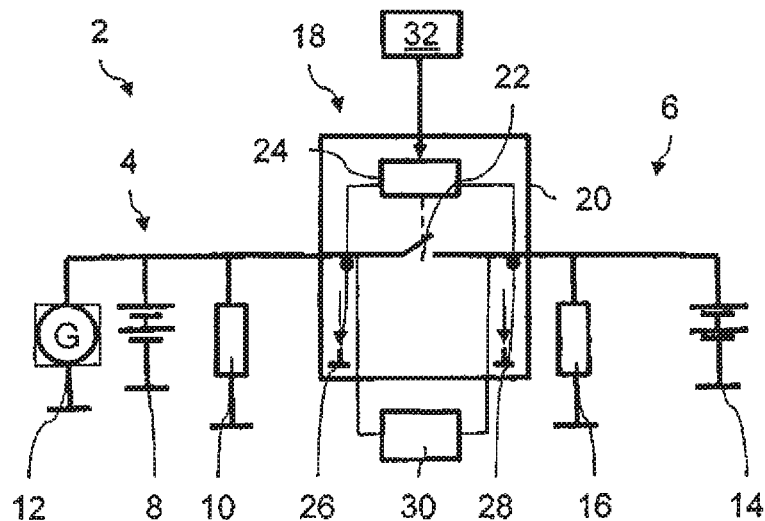
FIG. 1 shows a power supply system with two electric systems.

FIG. 1 shows a power supply system 2 of a motor vehicle that is not illustrated in FIG. 1. The power supply system 2 features a first electric system 4 and a second electric system 6. The first electric system 4 features a first motor vehicle battery 8, as well as a first consumer 10. In addition, a generator 12 is provided and driven by a motor vehicle engine that is not illustrated in FIG. 1. The generator 12 serves for charging the first motor vehicle battery 8, as well as for supplying the first consumer 10 with energy as long as the engine is running.

The second electric system 6 features a second motor vehicle battery 14, as well as at least one second safety-relevant consumer 16. The second safety-relevant consumer 16 is supplied with power by a second motor vehicle battery 14.

An autonomous switch 18 is provided between the first electric system 4 and the second electric system 6. The autonomous switch 18 features a housing 20, in which a switch 22 is provided, by which the first electric system 4 and the second electric system 6 can be coupled to one another. In addition, an autonomous control 24 is provided and designed for actuating the switch 22 and thereby couple or decouple the first electric system 4 and the second electric system 6 to/from one another.

The autonomous control 24 features two voltage meters 26, 28. The voltage meter 26 measures a voltage in the first electric circuit 4 and the voltage meter 28 measures a voltage in the second electric circuit 6. An impending failure of the energy supply in the first electric system 4 or in the second electric system 6 can be detected based on certain limiting voltages not being reached or exceeded or based on detecting a rapid voltage drop in the first electric system 4 or in the second electric system 6. In such instances, the autonomous control 24 can actuate the switch 22 sufficiently fast and couple the first electric system 4 and the second electric system 6 to one another by closing the switch 22.

A DC/DC converter 30 is additionally provided. The second motor vehicle battery 14 can be charged with the aid of the DC/DC converter 30.

The autonomous control 24 is connected to a motor vehicle control 32. Control commands can be transmitted to the autonomous switch 18 by the motor vehicle control 32. These control commands may cause the switch 22 to be closed, the switch 22 to be opened or the switch to be operated in an autonomous mode, wherein the autonomous switch 18 is operated in the autonomous mode as described above and can cause the automatic coupling of the first electric system 4 and the second electric system 6. The control commands of the motor vehicle control 32 may depend on the operating mode.

Figure 2:
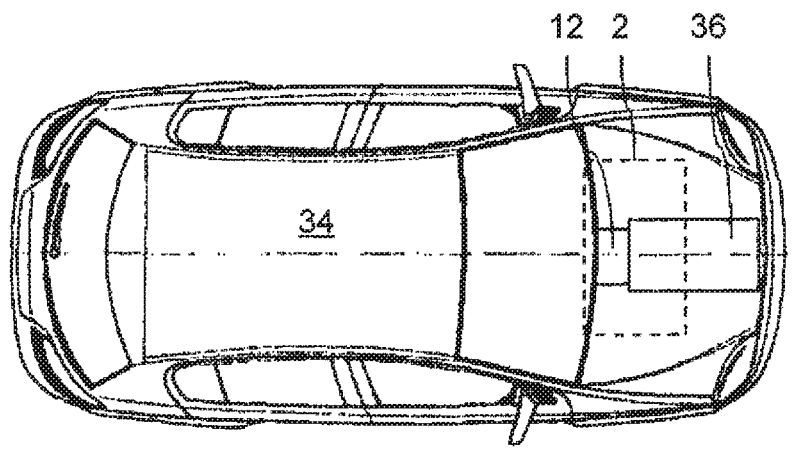
FIG. 2 shows a motor vehicle with a power supply system according to FIG. 1.

FIG. 2 shows a motor vehicle 34 with the above-described power supply system 2 (framed with broken lines). The generator 12 is coupled to an engine 36 and driven thereby.

Figure 3:
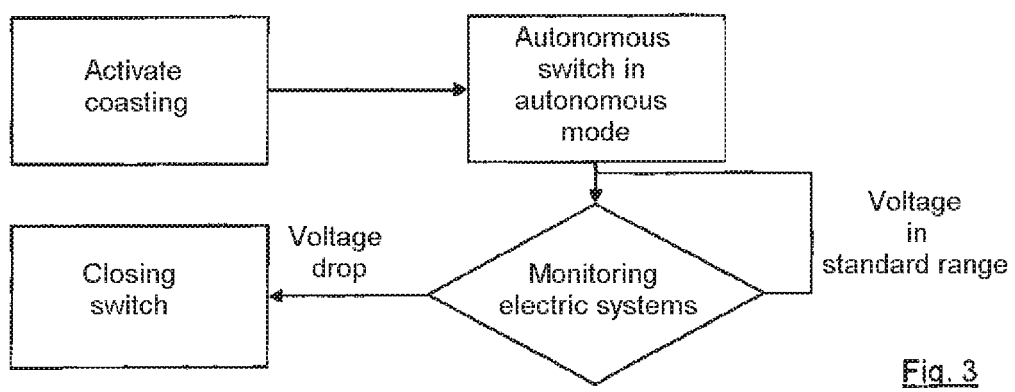
FIG. 3 shows a flowchart of a method for operating the power supply system according to FIG. 1.

FIG. 3 shows a flowchart of the method. Once the motor vehicle switches to the coasting mode (rolling motor vehicle with its engine is shut off), the autonomous switch 18 is set to an autonomous mode by the motor vehicle control 32. In the autonomous mode, the respective voltages in the first electric system 4 and the second electric system 6 are subsequently monitored. The switch 22 remains in the open position as long as both voltages do not show any abnormalities, i.e. as long as certain limiting voltages are respectively not exceeded or not reached and as long as certain voltage drop rates are not reached. However, if it is detected that the limiting voltages are exceeded or not reached or an excessively fast voltage drop in the first electric system 4 or in the second electric system 16 is detected, the autonomous control 24 closes the switch 22 and thereby connects the first electric system 4 to the second electric system 6. The coasting mode can be interrupted.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the invention as set forth in the appended claims and their legal equivalents.

What is claimed is:

1. A power supply system of a motor vehicle with a motor vehicle engine and a motor vehicle control, the power supply system comprising:
a first electric system including a first battery coupled to a first electric power consumer;
a second electric system including a second battery coupled to a second electric consumer;
an autonomous switch comprising an autonomous control coupled to the motor vehicle control, a first voltage meter coupled to the first electric system, a second voltage meter coupled to the second electric system, and a switch element configured to selectively connect and disconnect the first electric system and the second electric system based on commands from the autonomous control,
wherein the autonomous switch is configured to operate in a passive mode when the motor vehicle control indicates that the motor vehicle is operating with the motor vehicle engine running and in an active mode when the motor vehicle control indicates that the motor vehicle is operating in a coasting mode in which the motor vehicle engine is shut-off while driving,
wherein, during the active mode, the first voltage meter is used by the autonomous control to monitor the first electric system and the second voltage meter is used by the autonomous control to monitor the second electric system,
wherein, during the passive mode, the autonomous control does not monitor the first electric system and the second electric system using the first voltage meter and the second voltage meter,
wherein, during the active mode, the autonomous control commands the switch element to connect the first electric system and the second electric system to one another by closing the switch element when a failure or impending failure of one of the first battery or the second battery is detected by using one of the first voltage meter or the second voltage meter.

2. The power supply system according to claim 1, wherein the second electric consumer comprises at least one of a power steering system, a motor vehicle display, a vehicle sensor, or an electric actuator.

3. The power supply system according to claim 2, further comprising a generator coupled to the first electric system and configured to be driven by the motor vehicle engine to charge the first battery when in the passive mode.

4. The power supply system of claim 3, wherein, in the active mode upon detecting the failure or the impending failure of the second battery, the autonomous control is configured to command the switch element to connect the first electric system and the second electric system such that the first battery can charge the second battery.

5. The power supply system of claim 4, wherein, in the active mode upon detecting the failure or the impending failure of the first battery, the autonomous control is configured to command the switch element to connect the first electric system and the second electric system such that the second battery can charge the first battery.

6. The power supply system according to claim 2, further comprising a DC/DC converter connected to at least one of the first electric system and the second electric system.

7. The power supply system according to claim 1, wherein each of the first voltage meter and the second voltage meter is configured to measure a voltage drop rate.

8. The power supply system according to claim 1, wherein the first voltage meter and the second voltage meter form a voltage differential meter between the first electric system and the second electric system.

9. A motor vehicle comprising an engine and at least one power supply system according to claim 1.

10. The power supply system of claim 1, wherein, after detecting the failure or the impending failure and closing the switch element, the autonomous control is configured to instruct the motor vehicle control to terminate the coasting and start the motor vehicle engine.

11. The power supply system of claim 10, wherein, after the motor vehicle engine has been started upon the detecting the failure or the impending failure, the autonomous control is configured to open the switch element.

12. A method for operating a power supply system in a motor vehicle having a motor vehicle engine and a motor vehicle control, the power supply system having a first electric system including a first battery coupled to a first electric power consumer, a second electric system including a second battery coupled to a second electric consumer, and an autonomous switch comprising an autonomous control coupled to the motor vehicle control, a first voltage meter coupled to the first electric system, a second voltage meter coupled to the second electric system, and a switch element configured to selectively connect and disconnect the first electric system and the second electric system, the method comprising:
operating the autonomous switch in a passive mode when the motor vehicle control indicates that the motor vehicle is operating with the motor vehicle engine running, wherein in the passive mode the first electric system and the second electric system are not monitored by the autonomous control using the first and second voltage meters;

operating the autonomous switch in an active mode when the motor vehicle is in a coasting mode in which the motor vehicle engine is shut-off while driving;

using, by the autonomous control during the active mode, the first voltage meter to monitor the first electric system and the second voltage meter to monitor the second electric system;

detecting, by using at least one of the first voltage meter or the second voltage meter during the active mode, a failure or impending failure of at least one of the first battery or the second battery; and connecting the first electric system and the second electric system to one another by the autonomous control closing the switch element when the failure or the impending failure is detected during the active mode.

13. The method according to claim 12, wherein the detecting of the failure or the impending failure of the at least one of the first battery or the second battery is based on a lower limiting voltage not being reached or an upper limiting voltage being exceeded.

14. The method according to claim 12, wherein the detecting of the failure or the impending failure of at least one of the first battery or the second battery is based on a voltage drop rate.

* * * * *